April 21, 1931. J. SCHULMAN 1,801,289
BUMPER FOR MOTOR VEHICLES
Filed Aug. 13, 1930 2 Sheets-Sheet 1
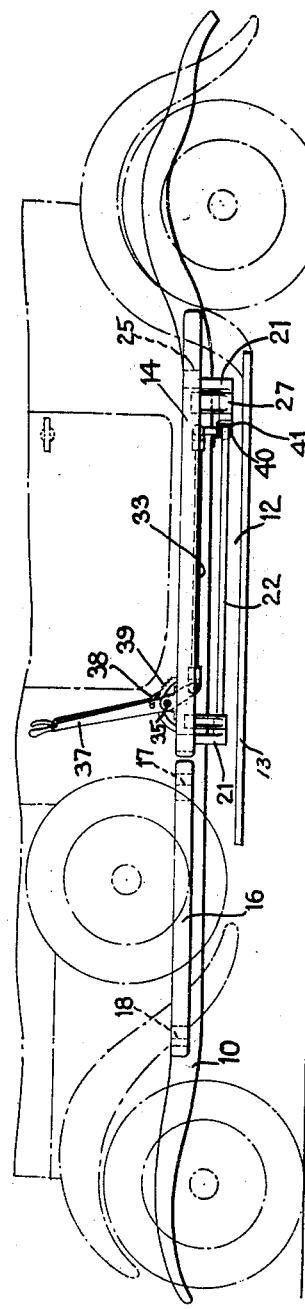
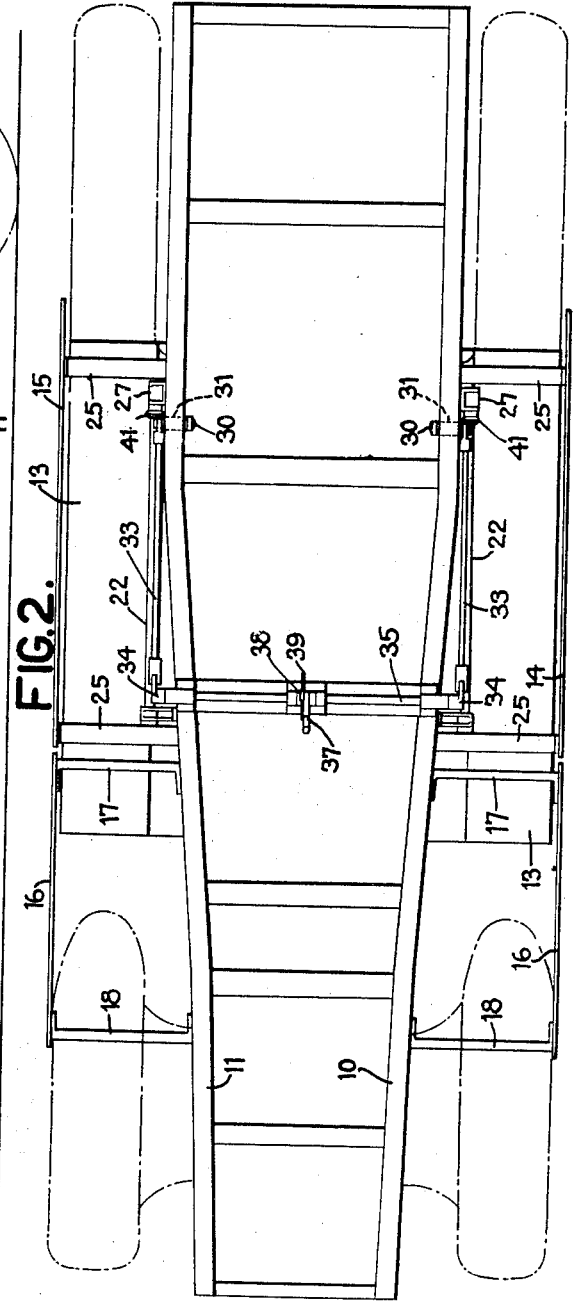
INVENTOR
JOSEPH SCHULMAN
BY ATTORNEYS
Bohleber & Ledbetter

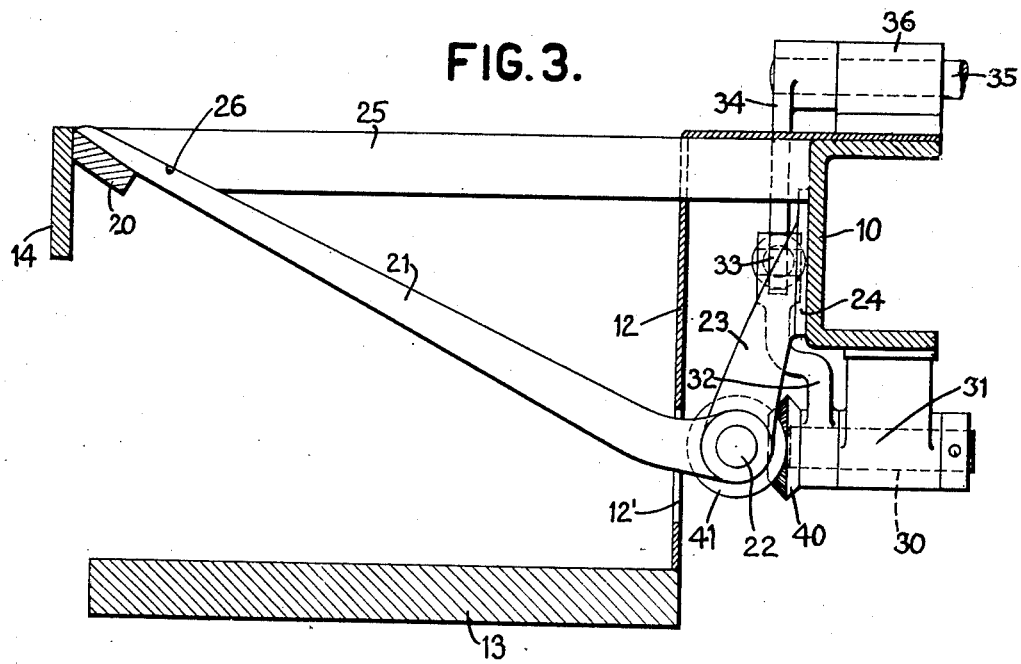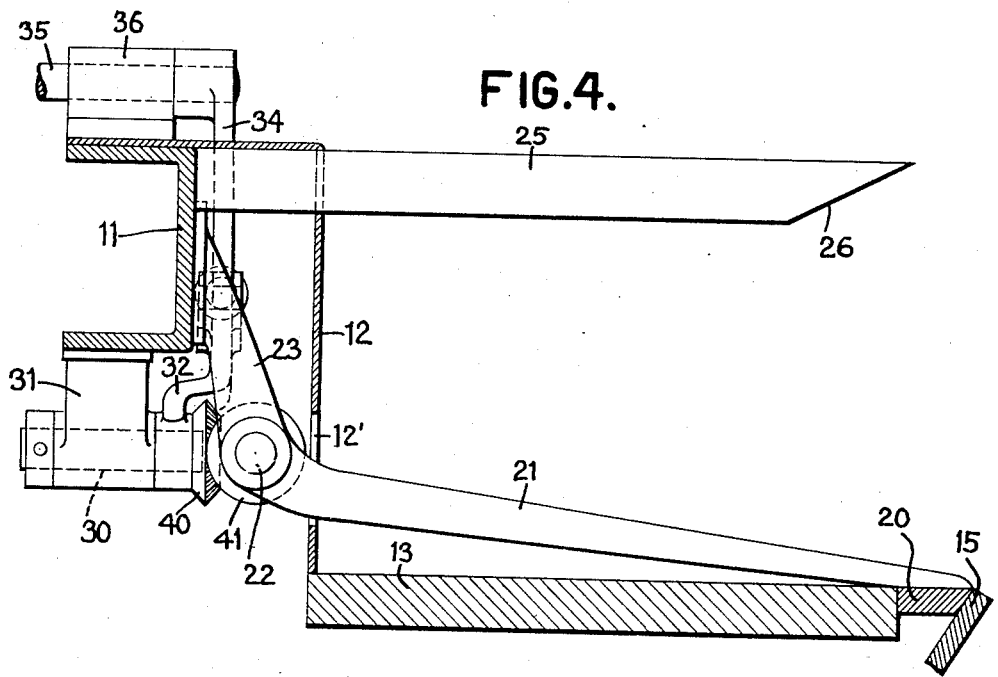

Patented Apr. 21, 1931

1,801,289

UNITED STATES PATENT OFFICE

JOSEPH SCHULMAN, OF BROOKLYN, NEW YORK

BUMPER FOR MOTOR VEHICLES

Application filed August 13, 1930. Serial No. 474,389.

This invention relates to bumpers for motor vehicles and more particularly to side bumpers for such vehicles movable, at the instance of the operator, from a protective position to a position permitting ingress to and exit from the vehicle.

One object of the invention is the provision of a side bumper which has the mechanical strength to resist the shock of impact in the event of collision. Accordingly, the bumper is supported directly from the chassis frame.

Another object of the invention is the provision of a bumper disposed along the running board or step to protect the side of a vehicle, which bumper is movable from door protecting position to one in which it does not interfere with the use of the step in entering or leaving the vehicle. In accordance with this aspect of the invention, the side bumper is movable to a position in which it lies substantially in the plane of the step.

The invention also seeks a side bumper which is practical from the standpoint of ease and cheapness of manufacture, practicability of installation and convenience in use. The bumper comprises generally a bar carried by arms extending from a rock shaft turning in brackets secured to the chassis frame, the rock shaft being rotated by means of a bevel gear connection from a point within the vehicle between two extreme positions, i. e., that in which the bumper is before the door and that in which it is below the door. In protective position, the bumper is braced by auxiliary shock receiving elements which transmit the force of impact directly to the chassis.

These and other objects of the invention and the means for their attainment will be more apparent from the following detailed description, taken in connection with the accompanying drawings, illustrating one embodiment by which the invention may be realized, and in which:—

Figure 1 is a view in side elevation showing the side bumper in operative or protective position, the outline of the vehicle being indicated in dot and dash lines.

Figure 2 is a plan view of a vehicle chassis to which the side bumpers are applied and showing particularly the manually operated mechanism which actuates the bumpers.

Figure 3 is a transverse sectional view through the longitudinal side frame member of the chassis and showing particularly the manner in which the side bumper is operated and supported, the bumper being shown in position to protect the side of the car.

Figure 4 is a view similar to Figure 3, but showing the bumper on the other side of the vehicle, in inoperative position so that entrance may be gained to the car.

Referring first to Figures 1 and 2, the longitudinal side frame members of the vehicle chassis are shown at 10 and 11, respectively, the vehicle body, fenders and wheels which form no part of the present invention being shown in dot and dash lines to indicate the relative position of the parts and, therefore, no reference characters have been applied thereto. Supported in usual manner from the vehicle, as by a frame member 12, is the step or running board indicated on each side of the vehicle at 13. A movable protective element or side bumper takes the form of a bar shown above the step on each side in Figures 1 and 2 at 14 and 15, respectively. Forwardly of the movable bars 14 and 15, the vehicle is provided with stationary side bumper bars 16, which are supported by outwardly extending frame members or braces 17 at the rear ends of the bars 16, and braces 18 at the forward ends of these bars, the braces being secured directly to the chassis. It is to be noted that the stationary bars 16 are disposed in substantially the same horizontal and vertical planes as the movable side bumper bars 14 and 15, but being disposed forwardly of the vehicle entrance, they need not be movable and hence are carried by the immovable brackets. They extend just slightly forward of the rearwardly and downwardly extending portions of the front fenders. The movable bars 14 and 15 extend rearwardly from the rear ends of the stationary bars 16 and preferably overlap the forwardly and downwardly extending portions of the rear fenders.

Referring now to Figure 3, it will be seen that the side bumper bar 14 is reenforced by a longitudinally extending reenforcing member 20 angularly disposed with respect to the bar 14 and to which the operating arms 21 are secured. These arms are fixedly mounted on a rock shaft 22 and protrude through apertures 12' in the frame member 12 extending longitudinally of the vehicle, outwardly of and just below the longitudinal side frame member 10 from which it is supported by the brackets 23. The brackets 23 are formed at their upper end with a base or flange 24 adapted to be riveted, bolted, welded or otherwise rigidly secured directly to the side frame member 10. At their lower ends each bracket is formed, as shown, with a bearing 27 for the rock shaft 22. There is one of these brackets 23 on each end of the rock shaft 22. Also extending outwardly from the chassis and in a horizontal direction are spaced braces 25 whose outer ends lie in an inclined plane, as at 26, for engagement, say, by the reenforcing bar 20 when the bumper bar is in elevated position. Thus any blow or shock received by the bar 14 is transmitted directly from the side bumper construction to the braces 25 and through the braces 25 directly to the frame member 10, the arm 21 and bracket 23, of course, also transmitting some of the shock, but again to the chassis member 10. Near the rearward end of the rock shaft 22 and in the same plane thereof is a horizontally disposed stud shaft 30 mounted in a suitable bearing 31 affixed to the chassis member 10 and having affixed thereon outwardly of the bearing 31, an arm 32 which extends upwardly for connection by a link 33 with a downwardly extending arm 34 fixed on a cross shaft 35. This cross shaft 35 may, if desired, extend from side to side of the vehicle and be suitably journaled, say on the chassis, in suitable bearings, such as shown at 36. The shaft is rotated by means of the hand lever 37 which is adjustable in position as by the manually releasable pawl 38 engaging the toothed quadrant 39. The outer end of the stub shaft 30 is provided with a bevel gear 40 adapted to mesh with another bevel gear 41 on the rock shaft 22.

The structure on the opposite side of the vehicle is identical with that just described and may, if desired, be operated from the same cross shaft 35, and similar reference characters have been affixed thereto save only the bumper bar which is designated 15 for convenience in description.

When the bumper bar 14 is in protective position in front of the door as shown in Figure 3, and it is desired to enter or leave the vehicle, movement of the hand lever 38 to draw the link 33 forwardly will cause the rotation of the stub shaft 30 and with it the bevel gear 40, which in turn causes the rotation of the bevel gear 41 and rock shaft 22 in a counter-clockwise direction, as viewed in Figure 3, to rotate the arm 21 downwardly until the reenforcing member 20 lies substantially in the plane of the step or running board 13 as shown in Figure 4, and the bumper bar 15 is below the door. Unobstructed entrance or exit is facilitated. The bumper supporting arms 21 being spaced from one another on opposite sides of the door or doors are also out of the way in entering or leaving the vehicle.

It will thus be seen that a bumper has been provided which affords adequate protection for the side of the vehicle, all shock of impact being transmitted only to the chassis which is the strongest part of the vehicle structure. While the bumper is at such an elevation that it can adequately protect the more easily destructible fenders and body in the event of collision, it can be readily moved out of the way when a door is to be used.

While a hand operated lever 37 is illustrated as the bumper operating instrumentality, it will be obvious that foot operated means is within the purview of the invention and the term "manually operated means" is intended to include any means actuated by the vehicle operator. There has also been illustrated a vehicle having but a single entrance door, but it will be apparent that the invention is equally applicable to a vehicle with a plurality of doors in each side of the body, the space to be protected determining the length of the bumper bar and rock shaft, and, if necessary, the number of supporting arms and rock shaft bearing brackets.

Various modifications will occur to those skilled in the art in the configuration and disposition of the component elements going to make up the invention as a whole as well as in the selection and/or combination of the several features, some of which are capable of use independently of others and no limitation is intended by the phraseology of the foregoing specification or illustrations in the accompanying drawings except as indicated in the appended claims.

What is claimed is:—

1. A movable side bumper for a vehicle comprising bumper means and manually operable means to move the bumper means between two extreme positions.

2. A movable side bumper for a vehicle, comprising, in combination, bumper means, pivoted means supporting the bumper means and means to move the pivoted means about its pivot to move the bumper means between two extreme positions.

3. A movable side bumper for a vehicle, comprising, in combination, bumper means, pivoted means supporting the bumper means and manually operable means to move the pivoted means about its pivot to move the bumper means between two extreme positions.

4. A movable side bumper for a vehicle, comprising, in combination, bumper means, pivoted means supporting the bumper means and means to move the pivoted means about its pivot to move the bumper means between two extreme positions and bracing means for the bumper means in one position.

5. A movable side bumper for a vehicle, comprising, in combination, bumper means, pivoted means supporting the bumper means and manually operable means to move the pivoted means about its pivot to move the bumper means between two extreme positions and bracing means for the bumper means in one position.

6. In a vehicle having a chassis, in combination, side bumper means, rotatable means carried by the chassis, means carried thereby supporting the bumper means, and means to rotate the rotatable means to move the bumper means between two extreme positions.

7. In a vehicle having a chassis, in combination, side bumper means, rotatable means carried by the chassis, means carried thereby supporting the bumper means, and manually operable means to rotate the rotatable means to move the bumper means between two extreme positions.

8. In a vehicle having a chassis, in combination, side bumper means, rotatable means carried by the chassis, means carried thereby supporting the bumper means, and means to rotate the rotatable means to move the bumper means between two extreme positions and to brace the bumper means in one position.

9. A movable side bumper for a vehicle, comprising, in combination, a bracket carried by the chassis, a rock shaft journaled in the bracket, an arm fixed on the rock shaft, a bumper bar carried by the arm and means to rotate the rock shaft to move the bumper bar from a position in front of a vehicle door to a position therebelow.

10. A movable side bumper for a vehicle, comprising, in combination, a bracket carried by the chassis, a rock shaft journaled in the bracket, an arm fixed on the rock shaft, a bumper bar carried by the arm and manually operable means to rotate the rock shaft to move the bumper bar from a position in front of a vehicle door to a position therebelow.

11. A movable side bumper for a vehicle, comprising, in combination, a bracket carried by the chassis, a rock shaft journaled in the bracket, an arm fixed on the rock shaft, a bumper bar carried by the arm, means to rotate the rock shaft to move the bumper bar from a position in front of a vehicle door to a position therebelow and bracing means carried by the chassis for the bumper bar in the first named position.

12. In a vehicle having a chassis, in combination, brackets carried by the chassis, a rock shaft journaled in the brackets, arms fixed on the rock shaft, a bumper carried on the arms, a stub shaft, driving means between the stub shaft and rock shaft, an arm on the stub shaft and manually operable means connected with the arm to rotate the shafts and move the bumper between two extreme positions.

13. In a vehicle having a chassis, in combination, brackets carried by the chassis, a rock shaft journaled in the brackets, arms fixed on the rock shaft, a bumper carried on the arms, a stub shaft, driving means between the stub shaft and rock shaft, an arm on the stub shaft and manually operable means connected with the arm to rotate the shafts and move the bumper between two extreme positions and a brace for the bumper in one position.

14. In a vehicle having a chassis, in combination, brackets carried by the chassis, a rock shaft journaled in the brackets, arms fixed on the rock shaft, a bumper bar carried by the arms, a reenforcing bar for the bumper bar carried with the arms, a stub shaft carried by the chassis, interengaging gearing on the stub shaft and rock shaft, respectively, an arm fixed on the stub shaft, a cross shaft, manually operable means to rotate the cross shaft, an arm fixed on the cross shaft, and a link between the extremity of the last named arm and the extremity of the arm on the stub shaft whereby the several shafts may be rotated to move the bumper bar between two extreme positions and a brace carried by the chassis and engaged by the bumper bar in one position.

15. In a vehicle having a chassis in combination brackets carried by the chassis, a rock shaft journaled in the brackets, arms fixed on the rock shaft, a bumper bar carried by the arms, a reenforcing bar for the bumper bar carried with the arms, a stub shaft carried by the chassis, a worm gear fixed on the stub shaft, a worm on the rock shaft with which the worm gear meshes, an arm fixed on the stub shaft, a cross shaft, manually operable means to rotate the cross shaft, an arm fixed on the cross shaft, and a link between the extremity of the last named arm and the extremity of the arm on the stub shaft whereby the several shafts may be rotated to move the bumper bar between two extreme positions.

16. In a vehicle having a chassis, in combination, brackets carried by the chassis, a rock shaft journaled in the brackets, arms fixed on the rock shaft, a bumper bar carried by the arms, a reenforcing bar for the bumper bar carried with the arms, a stub shaft carried by the chassis, a worm gear fixed on the stub shaft, a worm on the rock shaft with which the worm gear meshes, an arm fixed on the stub shaft, a cross shaft, manually operable means to rotate the cross shaft, an arm fixed on the cross shaft, and a link between the extremity of the last named arm and the extremity of the arm on the stub shaft whereby the several shafts may be rotated to move the bumper bar between two extreme positions and a brace carried by the chassis and engaged by the bumper bar in one position.

In testimony whereof I affix my signature.

JOSEPH SCHULMAN.